(12) United States Patent
Usgaonkar et al.

(10) Patent No.: US 8,402,237 B2
(45) Date of Patent: Mar. 19, 2013

(54) PRESENTATION OF A READ-ONLY CLONE LUN TO A HOST DEVICE AS A SNAPSHOT OF A PARENT LUN

(75) Inventors: Ameya Prakash Usgaonkar, Bangalore (IN); Kamlesh Advani, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 461 days.

(21) Appl. No.: 12/684,132

(22) Filed: Jan. 8, 2010

(65) Prior Publication Data

US 2011/0173401 A1   Jul. 14, 2011

(51) Int. Cl.
*G06F 12/00* (2006.01)

(52) U.S. Cl. ........ 711/162; 711/170; 711/202; 711/156; 711/155; 711/E12.001

(58) Field of Classification Search ............... 711/161, 711/162, 165, E12.001, E12.103, 155, 156, 711/170

See application file for complete search history.

(56) References Cited

U.S. PATENT DOCUMENTS

| | | | | |
|---|---|---|---|---|
| 6,907,505 | B2 * | 6/2005 | Cochran et al. | 711/162 |
| 7,555,504 | B2 * | 6/2009 | Bixby et al. | 711/162 |
| 7,877,357 | B1 * | 1/2011 | Wu et al. | 707/639 |
| 8,082,411 | B1 * | 12/2011 | Seetharam et al. | 711/165 |
| 2005/0065985 | A1 * | 3/2005 | Tummala et al. | 707/201 |
| 2011/0106764 | A1 * | 5/2011 | Wu et al. | 707/639 |

* cited by examiner

*Primary Examiner* — Pierre-Michel Bataille
(74) *Attorney, Agent, or Firm* — Klein, O'Neill & Singh, LLP

(57) ABSTRACT

A method, apparatus, and system of presentation of a read-only clone Logical Unit Number (LUN) to a host device as a snapshot of a parent LUN are disclosed. In one embodiment, a method includes generating a read-write clone LUN of a parent LUN and coalescing an identical data instance of the read-write clone LUN and the parent LUN in a data block of a volume of a storage system. A block transfer protocol layer is modified to refer the read-write clone LUN as a read-only clone LUN, according to the embodiment. Furthermore, according to the embodiment, the read-only clone LUN is presented to a host device as a snapshot of the parent LUN.

19 Claims, 9 Drawing Sheets

DATA STRUCTURE VIEW 550
OF THE DATA BLOCK 116

PRESENTATION OF A READ-ONLY CLONE LUN TO A HOST DEVICE AS A SNAPSHOT OF A PARENT LUN

FIELD OF TECHNOLOGY

This disclosure relates generally to data storage and, in one example embodiment, to a method, apparatus and system of a presentation of a read-only clone Logical Unit Number (LUN) to a host device as a snapshot of a parent LUN.

BACKGROUND

A host device may want to create a snapshot of a LUN (e.g., a point-in-time, a consistent image, and/or a read-only version of the LUN that corresponds to a physically addressable storage unit) for a variety of reasons (e.g., data migration, data restoration, data resynchronization). The LUN may be located on a volume of a storage system (e.g., the volume may have many LUNs) that is accessible to the host device through a network (e.g., a local area network, a wide area network, a storage area network).

To create the snapshot of the LUN, the storage system may need to take snapshots of every LUN on the volume because a snapshot operation may need to be taken at a volume level. Taking the snapshot at the volume level may be space inefficient because additional storage space may be required for snapshots of LUNs that the host device does not request. For example, unrequested LUNs on the volume may continue to perform write operations which may reduce the amount of blocks that are commonly shared thereby increasing a space requirement. The extra space requirement may reduce an effective free space in the volume. Furthermore, additional processing power and time may be needed (e.g., because of more storage I/O, meta-data lookups for the I/O) to process the unrequested LUNs resulting in productivity losses and delay.

SUMMARY

A method, system and apparatus of a presentation of a read-only clone LUN to a host device as a snapshot of a parent LUN are disclosed. In one aspect, a method includes generating a read-write clone logical unit number (LUN) of a parent LUN and coalescing an identical data instance of the read-write clone LUN and the parent LUN in a data block of a volume of a storage system. In addition, the method includes modifying a data structure at a block transfer protocol layer level to refer to the read-write clone LUN as a read-only clone LUN, and presenting the read-only clone LUN to a host device as a snapshot of the parent LUN.

A Small Computer System Interface (SCSI) target may be modified to refer the read-write clone LUN as read-only through a target module of the storage system. The read-write clone LUN may be differentiated from the parent LUN with a SCSI inquiry data. The identical data instance of the read-write clone LUN and the parent LUN may be coalesced with a data deduplication operation. The data deduplication operation may be Single Instance (SIS) operation in which (1) unique data blocks of the parent LUN and the read-write clone LUN are stored in the volume of the storage system and (2) a meta-data that references the unique data blocks is created.

Coalescing the identical data instance of the read-write clone LUN and the parent LUN in the data block of the storage volume may include implementing a block sharing operation between the read-write clone LUN and the parent LUN with a deduplication module. The coalescing may be a background process that is configurable to operate in a manner that is an automatic coalescing, a scheduled coalescing, or a manual coalescing through a command line interface (CLI). The coalescing may occur at a 4 kilobyte granularity level, and may operate on an active file system of the volume of the storage system.

A modification of the read-only clone LUN may be prevented through a command communicated from the host device to the storage system that refers to the read-only clone LUN as the snapshot to prevent the modification of the read-only clone LUN. The data block transfer protocol layer may be revised to render the read-only clone LUN so that the read-only clone LUN may be presented to the host device as the snapshot of the parent LUN.

In another aspect, a system includes a host device having an initiator that requests a snapshot of a parent LUN, a network, and a storage system coupled to the host device through the network to present a read-only clone LUN of the parent LUN to the host device as the snapshot of the parent LUN. The system may include a deduplication module of the storage system to coalesce an identical data instance of the read-write clone LUN and the parent LUN with a data deduplication operation. The system may also include a target module of the storage system to modify a SCSI target to refer to the read-write clone LUN as read-only clone LUN.

In yet another aspect, a method includes creating a single SIS clone LUN as a functional copy of a parent LUN, marking the SIS clone LUN as read-only, and presenting the SIS clone LUN as a snapshot of the parent LUN to a host device. The SIS clone LUN may be differentiated from the parent LUN with a custom inquiry response data. A data block may be shared between the SIS clone and the parent LUN. A SCSI target may be modified to refer to the SIS clone LUN as the read-only clone of the parent LUN to the host device.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus and system of presentation of a read-only clone LUN to a host device as a snapshot of a parent LUN are disclosed. Although the present embodiments have been described with reference to specific example embodiments, it will be evident that various modifications and changes may be made to these embodiments without departing from the broader spirit and scope of the various embodiments.

Figure 1:
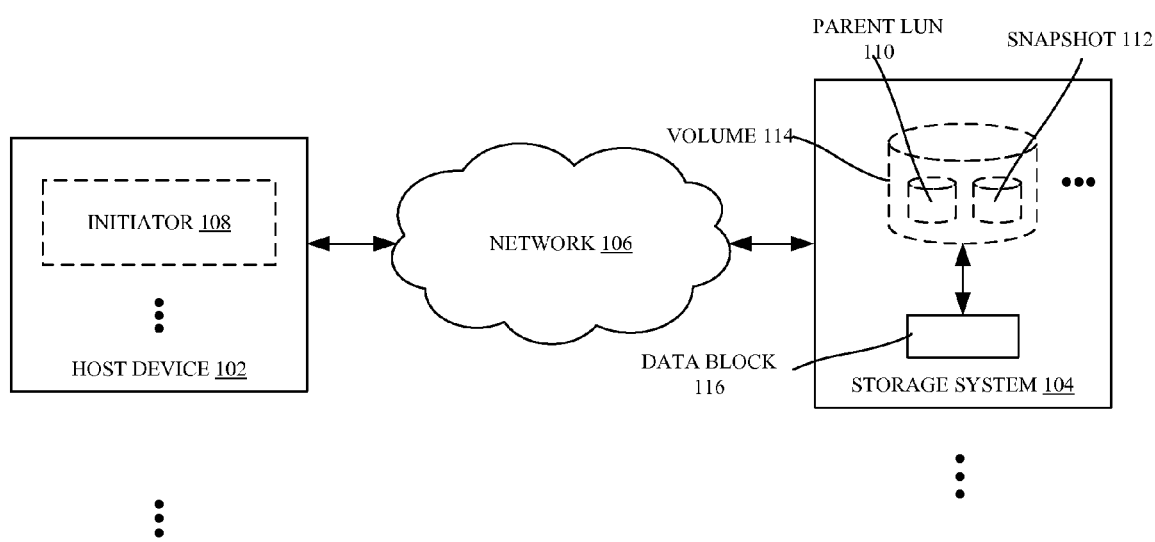
FIG. 1 is a system view of a host device communicating to a storage system through a network, according to one embodiment.

FIG. 1 illustrates a host device 102 communicating with a storage system 104 through a network 106. The host device 102 may be a data processing system that performs operations on the storage system 104. The host device 102 includes an initiator 108 in the embodiment illustrated in FIG. 1. The storage system 104 includes a volume 114 and a data block 116 in the embodiment illustrated in FIG. 1. The volume 114 includes a parent LUN 110 and a snapshot LUN 112.

The host device 102 may be a general-purpose computer configured to execute applications, such as database applications. Moreover, the host device 102 may interact with the storage system 104 in accordance with a client/server information delivery model. For example, the host device 102 may request the services of the storage system 104, and the storage system 104 may return the results of the services requested by the host device 102 by exchanging packets defined by an appropriate networking protocol.

Figure 2:
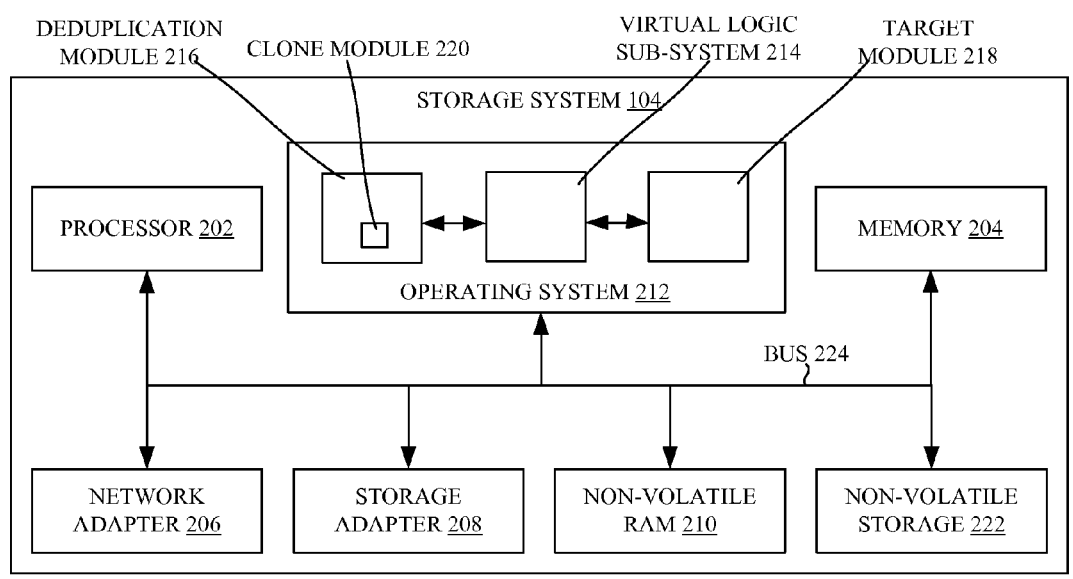
FIG. 2 is block diagram of the storage system having a processor, a memory, and an operating system, according to one embodiment.

The network 106 may be a Storage Area Network (SAN). For the purposes of this description, the term "network" may include any acceptable network architecture. The network 106 may interconnect a number of clients (e.g., the host device 102) to the storage system 104. The storage system 104 may be configured to control storage of data and access to data that is located in a non-volatile storage 222 (as illustrated in FIG. 2) of the storage system 104.

In some embodiments, network 106 can be a local area network (LAN), a wide area network (WAN), a virtual private network (VPN) using communication links over the Internet, for example, or any combination of network types. The storage system 104 may directly communicate with the host device 102 as a Network Attached Storage (NAS) device or as a Direct Attached Storage (DAS) device. The storage system 104 may operate in a hybrid SAN-NAS environment. For example, the storage system 104 may offer file-serving capabilities and also serve blocks over a Fibre Channel SAN.

Principles of various embodiments described herein are applicable to any type of NAS device running any type of operating system. For example, a NAS device can include the NearStore® storage system running the NetApp® Data ONTAP® operating system available from NetApp, Inc., Sunnyvale, Calif. Further, the principles of the various embodiments are applicable to any type of SAN.

In an example embodiment, the storage system 104 of FIG. 1 may also operate as a file server (also called a "filer"). For example, the storage system 104 may include a computer that provides file services relating to an organization of information on storage devices, such as non-volatile storage 222 as illustrated in FIG. 2.

Each "on-storage" file (e.g., on the non-volatile storage 222 of FIG. 2) may be implemented as a set of non-volatile storage blocks configured to store information, such as text, whereas the directory may be implemented as a specially-formatted file in which information about other files and directories are stored. The storage system 104 may be configured to operate according to the client/server model of information delivery to thereby allow many clients to access files stored on a server, e.g., the storage system 104.

In this model, the client (e.g., the host device 102 of FIG. 1) may include an application, such as a file system protocol, executing on a computer that communicates with storage system 104 over a computer network (e.g., the network 106), such as a point-to-point link, shared local area network (LAN), wide area network (WAN), or virtual private network (VPN) implemented over a public network such as the Internet. Each host device (e.g., the host device 102) may request services to the storage system 104 by issuing file system protocol messages (in the form of packets) to the storage system 104 over the network 106.

A type of file system implemented in storage system 104 according to one embodiment is a "write in-place" file system, an example of which is the Berkeley fast file system. In a write in-place file system, the locations of the data structures, such as inodes and data blocks (e.g., the data block 116) on non-volatile storage 222 of FIG. 2 can be fixed. An inode may be a data structure used to store information about a file, such as meta-data, whereas the data block may be a structure used to store the actual data for the file. The information included in an inode may include, e.g., ownership of the file, access permission for the file, size of the file, file type, and references to locations on disk of the data blocks for the file. The references to the locations of the file data may be provided by pointers, which may further reference indirect blocks that, in turn, reference the data blocks, depending upon the quantity of data in the file. Changes to the inodes and data blocks may be made "in-place" in accordance with the write in-place file system. If an update to a file extends the quantity of data for the file, an additional data block can be allocated and the appropriate inode may be updated to reference that data block.

Another type of file system implemented in storage system 104 according to one embodiment is a "write-anywhere" or "copy on write" file system (or the like) that does not overwrite data on disks. If a data block on disk is retrieved (read) from disk into memory and "dirtied" with new data, the data block may be stored (written) to a new location on disk to thereby optimize write performance. A write-anywhere file system may initially assume an optimal layout such that the data is substantially contiguously arranged on disks. The optimal disk layout may result in efficient access operations, particularly for sequential read operations, directed to the non-volatile storage 222 of FIG. 2. A particular example of a write-anywhere file system that can be configured to operate on the storage system 104, according to one embodiment, is the Write Anywhere File Layout (WAFL®) file system available from NetApp, Inc. The WAFL® file system can be implemented within a microkernel as part of the overall protocol stack of the filer and associated disk storage. This microkernel may be supplied as part of NetApp's Data ONTAP® storage operating system, which can reside on the storage system 104, and can process file-service requests from network-attached clients.

As used in various embodiments, the term "operating system" (e.g., as illustrated in FIG. 2) may refer to the computer-executable code operable on the storage system 104 that manages data access and may implement file system semantics, such as the Data ONTAP® storage operating system, which can be implemented as a microkernel. The Data ONTAP® storage operating system is available from NetApp, Inc. and implements a file system, such as the WAFL® file system. According to one embodiment, the operating system 212 of FIG. 2 can also be implemented as an application program operating over a general-purpose operating system, such as UNIX® or Windows®, or as a general-purpose operating system with configurable functionality, which is configured for storage applications as described in various embodiments.

Non-volatile storage 222 can be implemented as one or more storage "volumes" that include physical storage disks, defining an overall logical arrangement of storage space. Available filer implementations can serve a large number of discrete volumes. The non-volatile storage 222 can be organized as one or more groups of RAID devices. RAID implementations can enhance the reliability/integrity of data storage through the writing of data "stripes" across a given number of physical disks in the RAID group, and the appropriate storing of parity information with respect to the striped data.

In the example of a WAFL® file system, a RAID-4 implementation can be employed, which entails striping data across a group of disks, and storing the parity within a separate disk of the RAID group. As described herein, a volume can include at least one data disk and one associated parity disk (or possibly data/parity) partitions in a single disk arranged according to a RAID-4, or equivalent high-reliability, implementation.

In another example embodiment, RAID may be partitioned into several volumes. To represent each volume a SCSI target may be configured to provide a LUN. SCSI is a protocol entity for physically connecting and transferring data between the host device 102 and the storage system 104. The initiator 108 of the host device 102 may initiate a SCSI session by sending a SCSI command to the storage system 104 (e.g., a SCSI target). On receiving a command from the initiator 108, the SCSCI target of the storage system 104 may provide the required LUNs.

The term "snapshot" is a trademark of NetApp, Inc. and is used for purposes of this description to designate a persistent Consistency Point (CP) image. A Persistent Consistency Point Image (PCPI) may be a point-in-time representation of the filer, and more particularly, of the active file system, stored on a storage device (e.g., on the non-volatile storage 222) or in other persistent memory. A snapshot may have a name or other identifier that distinguishes the snapshot from other PCPIs taken at other points in time. The PCPI can also include other information (meta-data) about the active file system at the particular point in time for which the image is taken. The terms "PCPI" and "snapshot" shall be used in this description without derogation of NetApp's trademark rights. For example, the snapshot 112 may be viewed as an example of a read-only reference store. In contrast, the active file system may be viewed as an example of an active store that permits read and write operations.

The snapshot 112 can be viewed as a restorable version of a file system created at a predetermined point in time. In various embodiments, snapshots can be created on a regular schedule. The snapshot 112 may be stored on a volume 114 of the storage system 104 along with the active file system. The parent LUN 110 may be an original LUN assigned to a logical unit which is addressed by the actual I/O operations.

FIG. 2 is a block diagram of the storage system 104 having a processor 202 and a memory 204 on which the various embodiments described herein may be implemented. However, it will be understood by one skilled in the art that the concepts described herein apply to any type of file server and/or storage device, wherever implemented, including on a special-purpose computer, a general-purpose computer, and/or a standalone computer.

The storage system 104 in FIG. 2 includes the processor 202, the memory 204, a network adapter 206, a storage adapter 208, a non-volatile Random Access Memory (RAM) 210, and a non-volatile storage 222, all of which are interconnected by a bus 224. The operating system 212 is illustrated as including a deduplication module 216, a virtual logic sub-system 214, and a target module 218.

The deduplication module 216 may perform a deduplication operation (e.g., single instance storage (SIS) operation) to create a clone (e.g., may be read-only and/or a read-write clone) using a clone module 220 of the deduplication module 216. The virtual logic sub-system 214 may provide the clones to the target module 218 from a clone module 220 of the deduplication module 216 as illustrated in FIG. 2.

In one embodiment, the memory 204 is addressable by the processor 202 and the adapters 206 and 208 for storing software program code. The operating system 212 may functionally invoke deduplication operation with the deduplication module 216.

The network adapter 206 may include mechanical, electrical, and/or signaling circuitry needed to couple the storage system 104 to host device 102 over the network 106. The storage adapter 208 may interoperate with the operating system 212 and the non-volatile storage 222 locations. For example, the storage adapter 208 may interoperate with the operating system 212 and the non-volatile storage 222 locations associated with the volume 114 to access information requested by the host device 102 of FIG. 1. The storage adapter 208 may include input/output (I/O) interface circuitry that couples to the non-volatile storage 222 over an I/O interconnect arrangement, such as Fibre Channel. The information may be retrieved by the storage adapter 208 and, if necessary, may be processed by the processor 202 (and/or the storage adapter 208 itself) prior to being forwarded over the bus 224 to the network adapter 206, where the information can be formatted into appropriate packets and returned to the host device (e.g., the host device 102).

In one embodiment as illustrated in FIG. 2, the storage system 104 can include a non-volatile random access memory 210 (NVRAM) that can provide fault-tolerant backup of data, enabling the integrity of filer transactions to survive a service interruption based upon a power failure and/or other fault.

To facilitate the generalized access to the non-volatile storage 222, the operating system 212 may implement a file system that logically organizes the information as a hierarchical structure of directories and files on the non-volatile storage 222. Each "on-storage" file (or on-disk file) may be implemented as a set of disk blocks configured to store information, such as data, whereas the directory may be implemented as a specially formatted file in which other files and directories are stored. As noted above, in an exemplary embodiment described herein, the operating system 212 of the storage system 104 may be the NetApp® Data ONTAP® operating system available from NetApp, Inc., that implements the write-anywhere file layout (WAFL®) file system. It is noted that any other appropriate file system can be used, and as such, where the terms "WAFL" or "file system" are used, those terms should be interpreted broadly to refer to any file system that is adaptable to the teachings of the various embodiments disclosed herein.

Figure 3A:
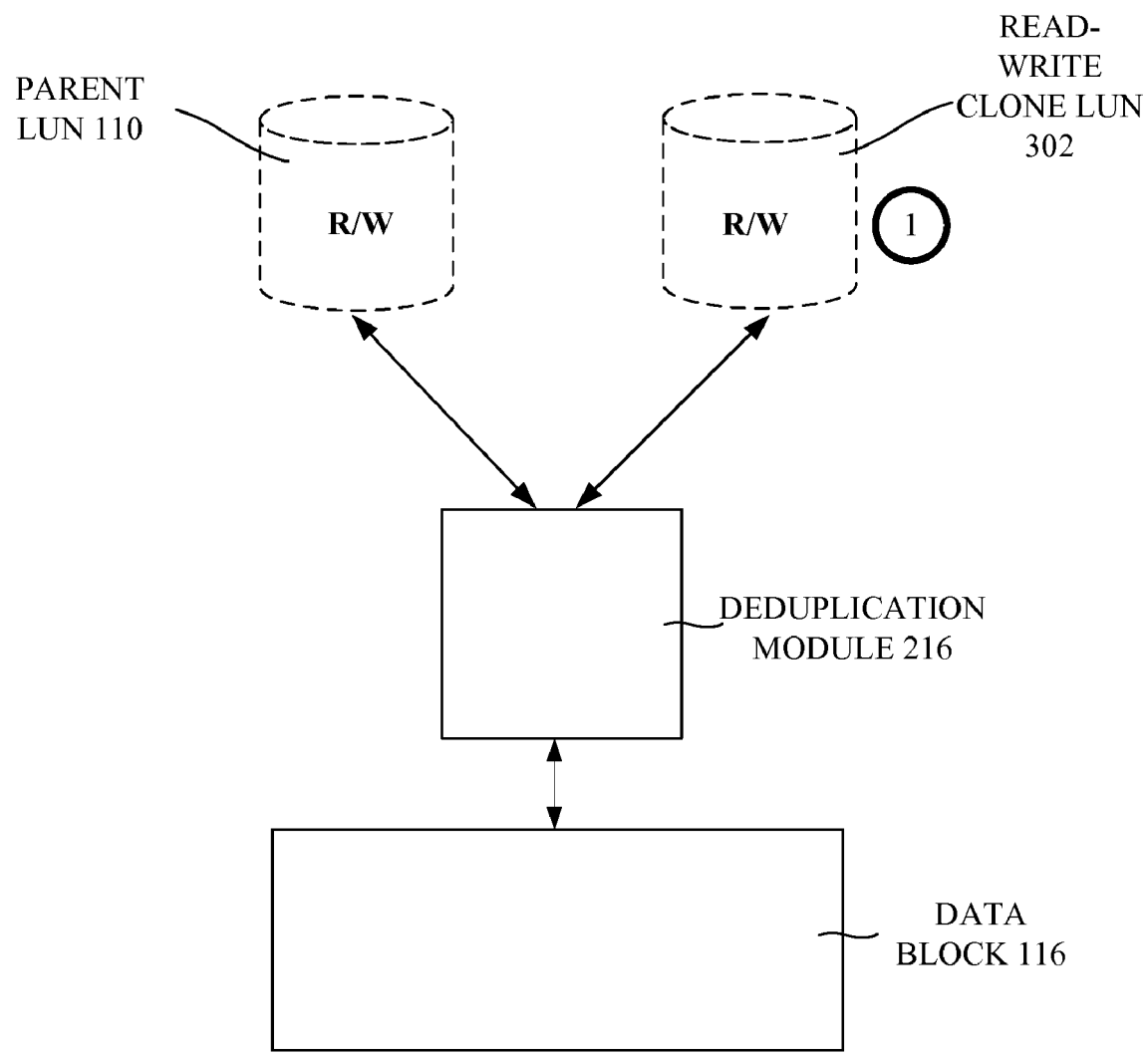
FIG. 3A is graphical process flow illustrating creation of a read-write clone LUN from a parent LUN, according to one embodiment.

FIG. 3A is graphical process flow illustrating creation of a read-write clone LUN from a parent LUN, according to one embodiment. In particular, a data block 116 may be shared between a read-write clone LUN 302 and a parent LUN 110 through the deduplication module 216 in accordance to one embodiment as illustrated in FIG. 3A. The read-write clone LUN 302 may be a functional clone of the parent LUN 110 created using the deduplication module 216 (e.g., a single instance storage clone). The parent LUN 110 may provide reference to a logical storage unit in the volume 114 of the storage system 104. The read-write clone LUN 302 and the parent LUN 110 may be differentiated through a SCSI inquiry data (e.g., used to obtain basic information from a target device).

The operation 'circle 1' shown in FIG. 3A may illustrate generation of the read-write clone LUN 302 which may be a functional copy of the parent LUN 110. The identical instances of the read-write clone LUN 302 and the parent LUN 110 may be coalesced using the deduplication module 216 during deduplication operation, according to one embodiment. The deduplication operation may be a Single Instance Storage (SIS) operation in which a unique block shared between the parent LUN 110 and the read-write clone LUN 302 may be stored in the volume 114 of the storage system 104.

Figure 3B:
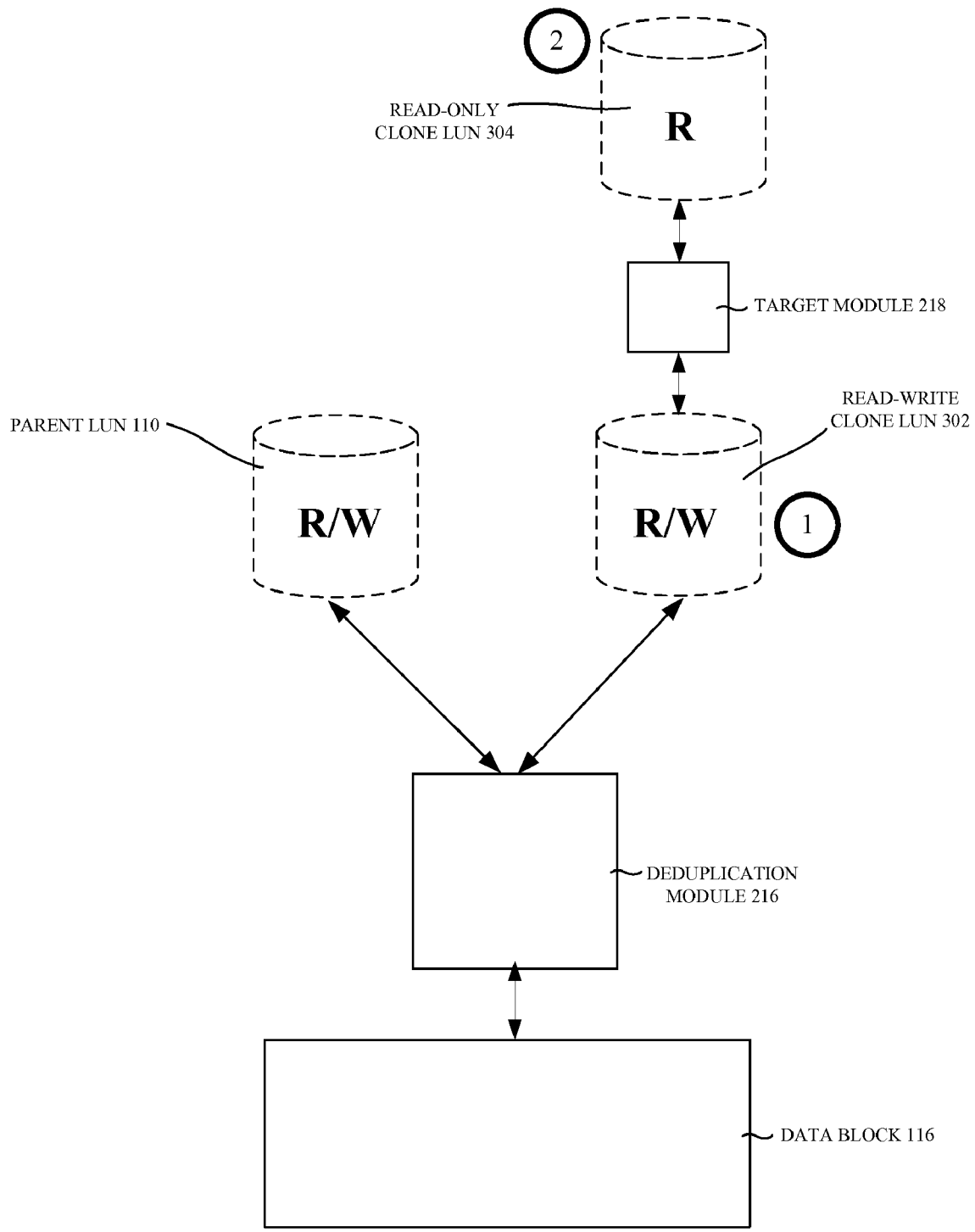
FIG. 3B is a graphical process flow illustrating creation of a read-only clone LUN from the read-write clone LUN of FIG. 3A, according to one embodiment.

FIG. 3B is a continuation graphical process flow illustrating creation of a read-only clone LUN 304 from the read-write clone LUN 302 of FIG. 3A, according to one embodiment. Operation 'circle 2' of FIG. 3B may occur after the operation 'circle 1' illustrated in FIG. 3A, according to one embodiment. The operation 'circle 2' illustrates marking of the read-write clone LUN 302 as a read-only clone LUN 304. The target module 218 of the storage system 104 may modify a SCSI target to refer to the read-write clone LUN 302 as the read-only clone LUN 304. The read-only clone LUN 304 may provide only read operations and thus any modification to the read-only clone LUN may be prevented.

Figure 3C:
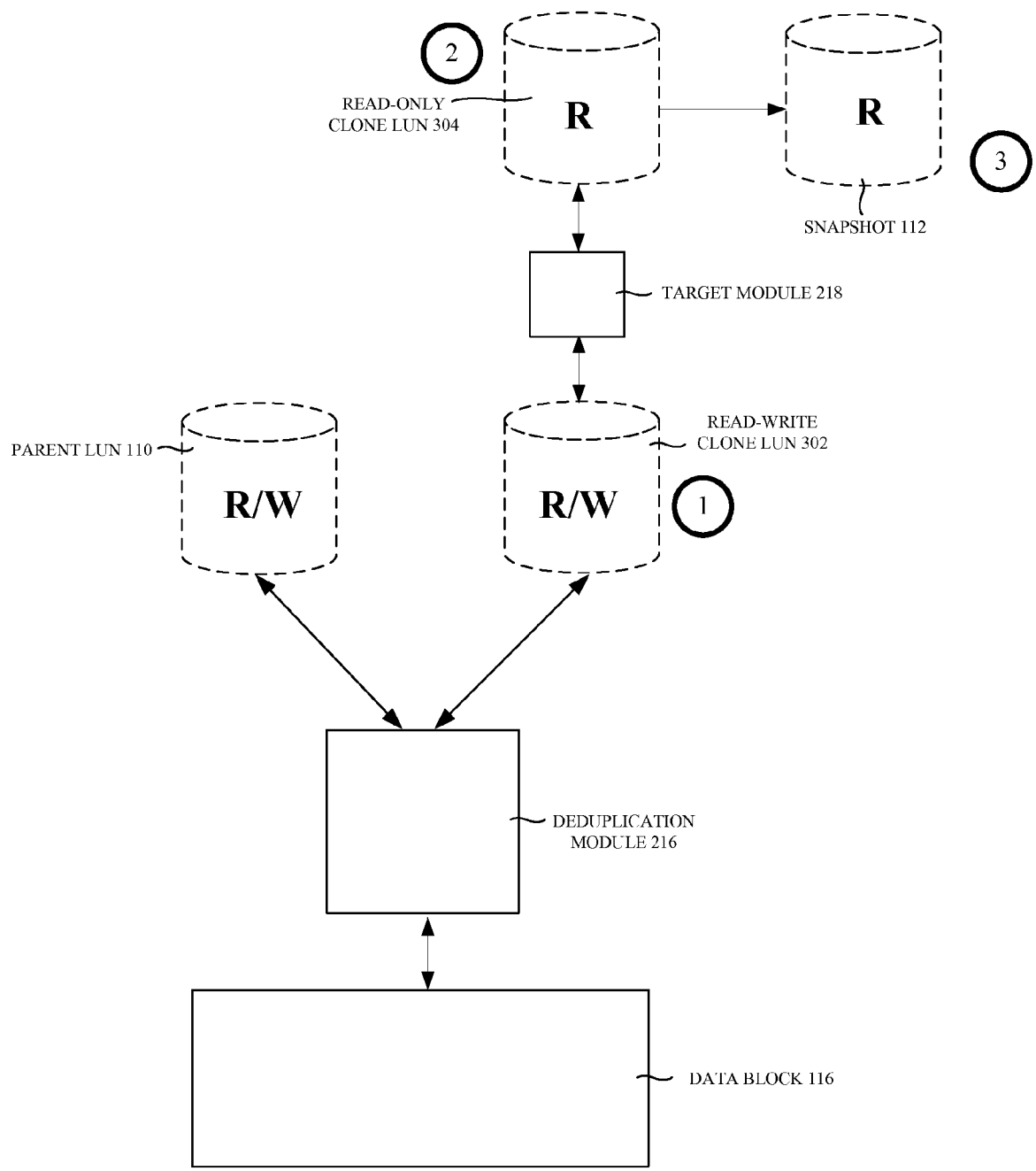
FIG. 3C is a graphical process flow illustrating creation of a snapshot from the read-only clone LUN of FIG. 3B, according to one embodiment.

FIG. 3C is a continuation graphical process flow illustrating creation of a snapshot 112 from the read-only clone LUN 304 of FIG. 3B, according to one embodiment. Further to the operation 'circle 2' illustrated in the process of FIG. 3B, operation 'circle 3' follows. In operation 'circle 3', the read-only clone LUN 304 may be presented as a snapshot (e.g., the snapshot 112) to the host device 102, according to one embodiment. A block transfer protocol of the SCSI target may be modified to render the read-only clone LUN 304 as a snapshot 112 of the parent LUN 110.

Figure 4:
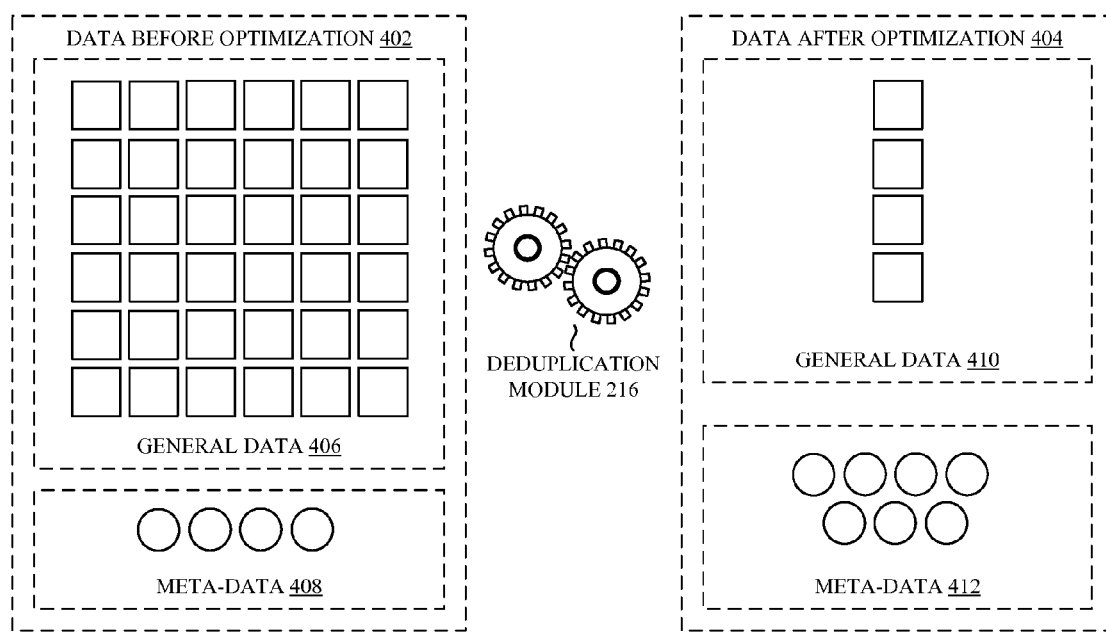
FIG. 4 is a diagrammatic view that illustrates data deduplication operation in a volume of the storage system, according to one embodiment.

FIG. 4 is a diagrammatic view that illustrates data deduplication operation in a volume of the storage system, according to one embodiment. In particular, FIG. 4 illustrates a data before optimization 402 and a data after optimization 404. The data before optimization 402 includes a general data 406 (e.g., content) and a meta-data 408 (e.g. information that describes the general data 406). Similarly, the data before optimization 402 includes a general data 410 (e.g., content) and a meta-data 412 (e.g. information that describes the general data 406). A block level deduplication operation is illustrated in the embodiment illustrated of FIG. 4. The deduplication operation may be provided for the volume 114 (e.g., may be a flexible volume that can dynamically increase in capacity) on the storage system such as the storage system 104 (e.g., fibre attached storage, Data ONTAP®, V-series system). The storage system 104 may provide a block level deduplication operation through the deduplication module 216 as previously described in FIG. 2 and as illustrated in FIG. 4.

The deduplication module 216 of FIG. 4 may perform a deduplication operation to produce an optimized data (e.g., data after optimization 404). The deduplication operation may allow storing unique data blocks in the flexible volume (e.g., the volume 114 of FIG. 1) and may create a small amount of meta data.

In an embodiment illustrated in FIG. 4 newly stored data blocks may be stored as general data on a flexible volume (e.g., the volume 114 of FIG. 1) of the storage system 104. The data blocks may be stored at a granular level of 4 KB in the general data segment or at a finer granularity. Each data block may have a digital finger print and during a deduplication process each finger print may be compared with the other finger prints in the flexible volume. The finger print may be a unique digital signature for every 4 KB data block. If two finger prints in the volume are found to be same, then a byte-for byte comparison may be performed for all the bytes in the block. Further, if an exact match occurs between the new data block and the existing data block, the duplicate data block may be discarded and a disk space in the storage system (e.g., the storage system 104) may be regained.

The deduplication operation may be enabled on several flexible volumes in the storage system 104. In an example embodiment, up to eight deduplication process can run concurrently on eight volumes within the same storage system 104 of FIG. 1. In another example embodiment, the deduplication operation may be performed on a scheduled day at a specific time and/or may be performed manually through a command line interface (CLI). When 20% of new data is written to the volume, deduplication process may run automatically on the volume.

When deduplication process runs for the first time on a flexible volume with existing data, the blocks in the flexible volume may be scanned and a fingerprint database may be created. The fingerprint database may include a sorted list of all fingerprints associated with the used blocks in the flexible volume. The fingerprints in the database may be checked for duplicates. If two fingerprints are found to be same, a byte-by-byte comparison of the blocks may be made to ensure that the two blocks are undeniably identical. Further, if the two blocks are found to be identical, the data block's pointer may be updated to the already existing data block and the duplicate data block may be released.

Figure 5:
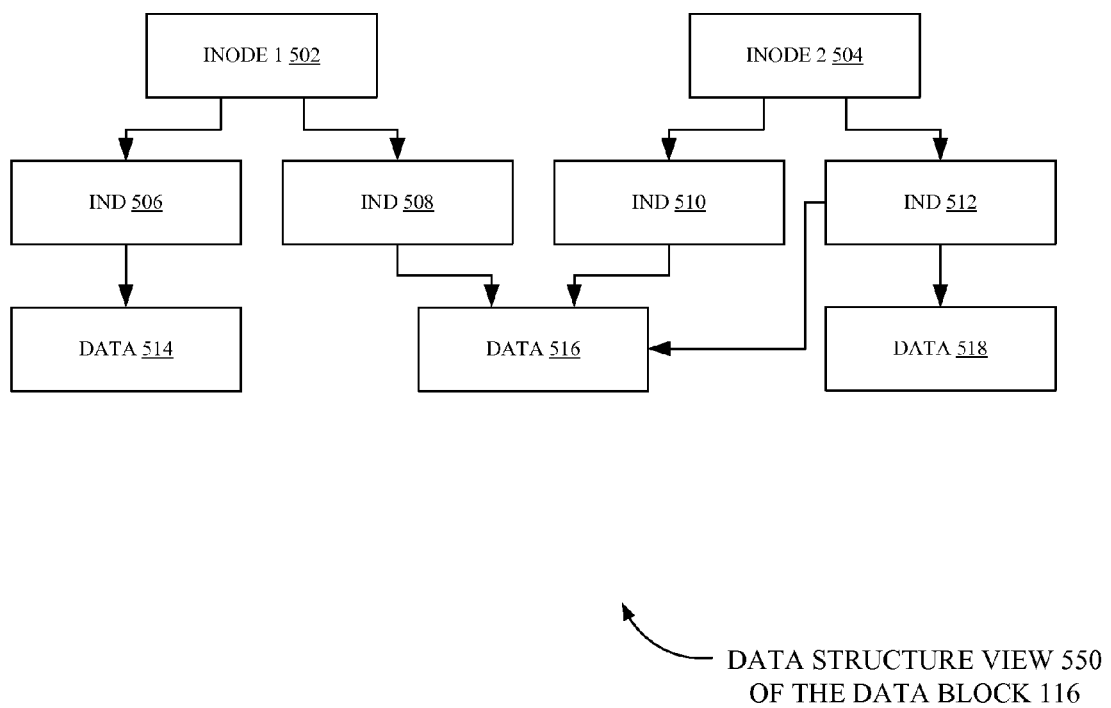
FIG. 5 is a block diagram of a data structure illustrating sharing of data blocks in a volume, according to one embodiment.

FIG. 5 is a block diagram of a data structure illustrating sharing of data blocks in a volume, according to one embodiment. In an embodiment illustrated in FIG. 5, three data blocks (e.g., a data 514, a data 516 and a data 518) are used for five references thereby saving two blocks. Each data block may have a block count reference kept in a metadata. The indirect blocks (e.g., an IND 506, an IND 508, an IND 510, and an IND 512) may point to one or more of a data (the data 514, data 516, and data 518). For example, the IND 506 may refer to the data 514, the IND 508 and the IND 510 may refer to the data 516, and the IND 512 may refer to the data blocks 516 and 518. In another aspect, additional indirect blocks may point to the data blocks and/or the existing indirect blocks may stop pointing to the data blocks. When there is no pointer to a data block, the data block may be released thereby reducing storage consumption.

The maximum sharing for a data block may be 255. For example, if there are 500 duplicate blocks, deduplication may reduce that to only 2 blocks. The releasing of a duplicate data block may require updating pointers of indirect inode (e.g., an inode 1 502, an inode 2 502 as illustrated in FIG. 5) to refer to an existing data block.

When an additional data is written to the de-duplicated volume, a fingerprint is created for each new block, and a change log file may be updated. The change log file may be sorted and sorted fingerprints thereof may be merged with the fingerprints of the fingerprint database. There may be a fingerprint record for each 4 KB data block and the fingerprints for all the data blocks in the volume may be stored in the fingerprint database file.

Figure 6:
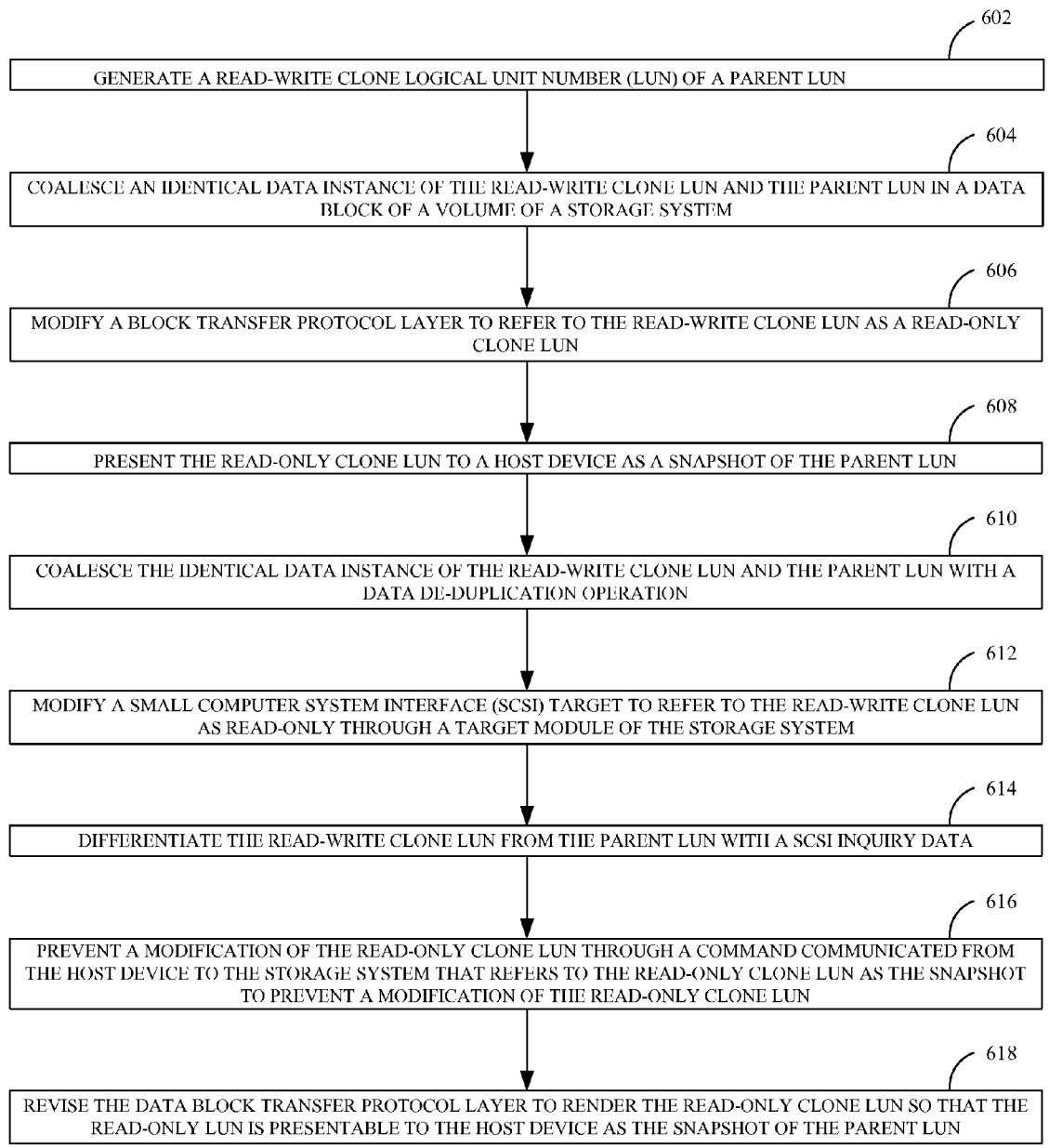
FIG. 6 is a process flow that illustrates presentation of a read-only clone LUN to a host device as a snapshot of a parent LUN, according to one embodiment.

FIG. 6 is a process flow that illustrates presentation of a read-only clone LUN 304 to a host device 102 as a snapshot 112 of a parent LUN 110, according to one embodiment. In operation 602, a read-write clone LUN (e.g., the read-write clone LUN 302 of FIG. 3A) of a parent LUN (e.g., the parent LUN 110 of FIG. 1) may be generated. In operation 604, an identical data instance of the read-write clone LUN 302 and the parent LUN 110 may be coalesced in a data block (e.g., the data block 116 of FIG. 1) of a volume (e.g., the volume 114 of FIG. 1) of a storage system (e.g., the storage system 104 of FIG. 1). In operation 606, a block transfer protocol layer may be modified to refer to the read-write clone LUN 302 as a read-only clone LUN (e.g., the read-only clone LUN 304 of FIG. 3A). In operation 608, the read-only clone LUN 304 may be presented to a host device (e.g., the host device 102 of FIG. 1) as a snapshot (the snapshot 112 as illustrated in FIG. 1) of the parent LUN 110. In operation 610, the identical data instance of the read-write clone LUN 302 and the parent LUN 110 may be coalesced with a data deduplication operation (as illustrated in FIG. 4). In operation 612, a SCSI target may be modified to refer the read-write clone LUN 302 as read-only through a target module (e.g., the target module 218 of FIG. 2) of the storage system 104. In operation 614, the read-write clone LUN 302 may be differentiated from the parent LUN 110 with a SCSI inquiry data. In operation 616, a modification of the read-only clone LUN 304 may be prevented through a command communicated from the host device 102 to the storage system 104. In operation 618, the data block transfer protocol layer may be revised to render the read-only clone LUN 304 for presentation to the host device 102 as a snapshot of the parent LUN 110.

Figure 7:
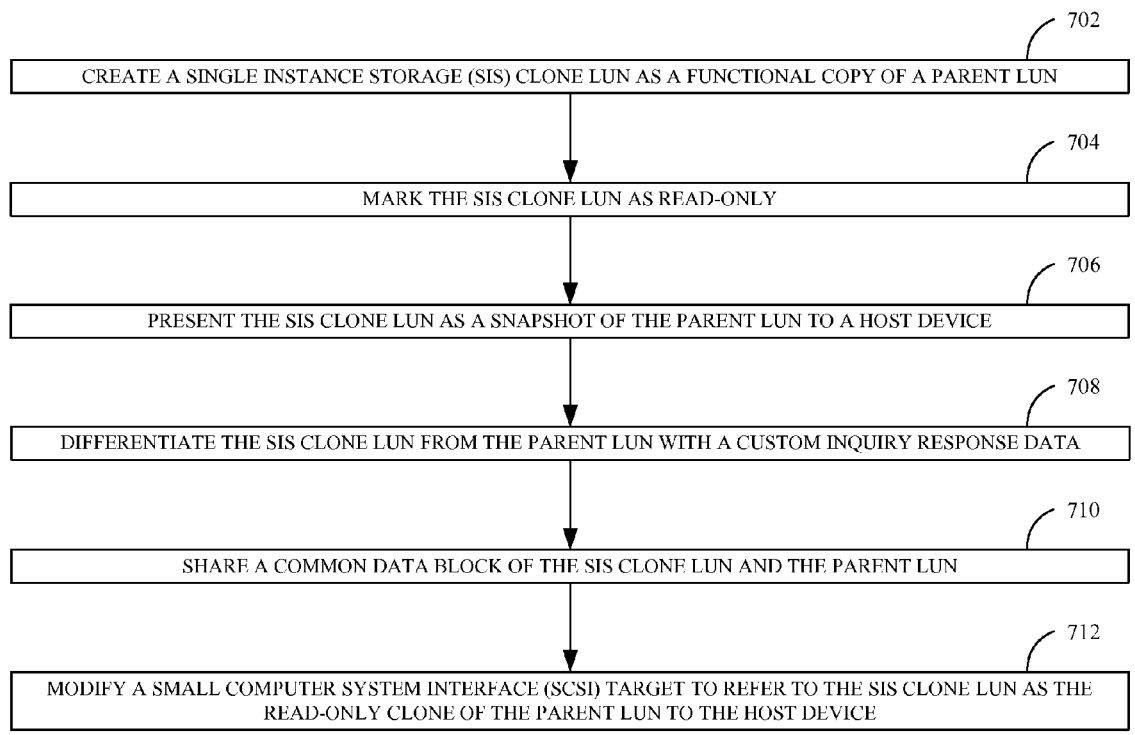
FIG. 7 is a process flow that illustrates creation of a snapshot of a parent LUN through the application of single instance storage deduplication technology, according to one embodiment.

FIG. 7 is a process flow that illustrates creation of a snapshot of a parent LUN through the application of single instance storage deduplication technology, according to one embodiment. In operation 702, a SIS clone LUN may be created as a functional copy of a parent LUN (e.g., may be the parent LUN 110 of FIG. 1). In operation 704, the SIS clone LUN may be marked as read-only. In operation 706, the SIS clone LUN may be presented as a snapshot of the parent LUN 110 to a host device (e.g., the host device 102 of FIG. 1). In operation 708, the SIS clone LUN may be differentiated from the parent LUN 110 with a custom inquiry response data (e.g., basic information received from the SIS clone LUN). In operation 710, a data block (e.g., the data block 116) may be shared between the SIS clone and the parent LUN 110. In operation 712, a SCSI target may be modified to refer to the SIS clone LUN as the read-only clone of the parent LUN to the host device.

Although the present embodiments have been described with reference to specific example embodiments, it will be evident that various modifications and changes may be made to these embodiments without departing from the broader spirit and scope of the various embodiments. Additionally, the various modules described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations). It is also within the scope of an embodiment to implement a program or code that can be stored in a machine-readable medium to permit a computer to perform any of the methods described above.

The above description of illustrated embodiments, including what is described in the abstract, is not intended to be exhaustive or to limit the claims to the precise forms disclosed. While specific embodiments of, and examples for, the claims are described herein for illustrative purposes, various equivalent modifications are possible within the scope of the claims, as those skilled in the relevant art will recognize.

These modifications can be made to the embodiments in light of the above detailed description. The terms used in the following claims should not be construed to limit the claims to the specific embodiments disclosed herein. Rather, the scope of the embodiments is to be determined entirely by the following claims, which are to be construed in accordance with established doctrines of claim interpretation. Accordingly, the specification and drawings are to be regarded in an illustrative rather than a restrictive sense.

What is claimed is:

1. A method comprising:
generating a read-write clone Logical Unit Number (LUN) of a parent LUN;
coalescing an identical data instance of the read-write clone LUN and the parent LUN in a data block of a volume of a storage system;
modifying a data structure at a block transfer protocol layer level to refer to the read-write clone LUN as a read-only clone LUN;
presenting the read-only clone LUN to a host device as a snapshot of the parent LUN;
and
coalescing the identical data instance of the read-write clone LUN and the parent LUN with a data deduplication operation; wherein the data deduplication operation is a Single Instance Storage (SIS) operation in which unique data blocks of the parent LUN and the read-write clone LUN are stored in the volume of the storage system and a meta-data is created that references the unique data blocks.

2. The method of claim 1, further comprising:
modifying a Small Computer System Interface (SCSI) target to refer to the read-write clone LUN as read-only through a target module of the storage system.

3. The method of claim 2, further comprising:
differentiating the read-write clone LUN from the parent LUN with a SCSI inquiry data.

4. The method of claim 1, wherein coalescing the identical data instance of the read-write clone LUN and the parent LUN in the data block of the storage volume comprises:
implementing a block sharing operation between the read-write clone LUN and the parent LUN with a deduplication module.

5. The method of claim 1, further comprising:
revising the data block transfer protocol layer to render the read-only clone LUN for presentation to the host device as the snapshot of the parent LUN.

6. The method of claim 1, wherein a machine is caused to perform the method of claim 1 when a set of instructions in a form of a non-transitory machine-readable medium is executed by the machine.

7. A method, comprising:
generating a read-write clone Logical Unit Number (LUN) of a parent LUN;
coalescing an identical data instance of the read-write clone LUN and the parent LUN in a data block of a volume of a storage system;
modifying a data structure at a block transfer protocol layer level to refer to the read-write clone LUN as a read-only clone LUN;
presenting the read-only clone LUN to a host device as a snapshot of the parent LUN;
coalescing the identical data instance of the read-write clone LUN and the parent LUN with a data deduplication operation; and
preventing a modification of the read-only clone LUN through a command communicated from the host device to the storage system that refers to the read-only clone LUN as the snapshot to prevent a modification of the read-only clone LUN.

8. The method claim 7, wherein the data deduplication operation is a Single Instance Storage (SIS) operation in which unique data blocks of the parent LUN and the read-write clone LUN are stored in the volume of the storage system and a meta-data is created that references the unique data blocks.

9. The method of claim 7, further comprising:
revising the data block transfer protocol layer to render the read-only clone LUN for presentation to the host device as the snapshot of the parent LUN.

10. A method, comprising:
generating a read-write clone Logical Unit Number (LUN) of a parent LUN;
coalescing an identical data instance of the read-write clone LUN and the parent LUN in a data block of a volume of a storage system;
modifying a data structure at a block transfer protocol layer level to refer to the read-write clone LUN as a read-only clone LUN; and
presenting the read-only clone LUN to a host device as a snapshot of the parent LLTN;
wherein the coalescing occurs at most a 4 kilobyte granularity level, and operates on an active file system of the volume of the storage system, and
wherein the coalescing is a background process that is configurable to operate in a manner that is at least one of an automatic coalescing, a scheduled coalescing, and a manual coalescing through a Command Line Interface (CLI).

11. The method of claim 10, further comprising:
coalescing the identical data instance of the read-write clone LUN and the parent LUN with a data deduplication operation; wherein the data deduplication operation is a Single Instance Storage (SIS) operation in which unique data blocks of the parent LUN and the read-write clone LUN are stored in the volume of the storage system and a meta-data is created that references the unique data blocks.

12. The method of claim 10, further comprising:
revising the data block transfer protocol layer to render the read-only clone LUN for presentation to the host device as the snapshot of the parent LUN.

13. A system comprising:
a host device having an initiator that requests a snapshot of a parent Logical Unit Number (LUN);
a network;
a storage system coupled to the host device through the network to present a read-only clone LUN of the parent LUN to the host device as the snapshot of the parent LUN; and
a deduplication module of the storage system to coalesce an identical data instance of the read-write clone LUN and the parent LUN with a data deduplication operation; wherein the data deduplication operation is a Single Instance, Storage (SIS) operatio in which unique data blocks of the parent LUN and the read-write clone LUN are stored in the volume of the storage system and a meta-data is created that references the unique data blocks.

14. The system of claim 13, further comprising:
a target module of the storage system to modify a small computer system interface (SCSI) target to refer to the read-write clone LUN as read-only clone LUN.

15. The system of claim 13, wherein the read-write clone LUN is differentiated from the parent LUN with a SCSI inquiry data.

16. The system of claim 13, wherein the storage system implements a block sharing operation between the read-write clone LUN and the parent LUN with the deduplication module.

17. A system of claim 13, wherein a modification of the read-only clone LUN is prevented through a command communicated from the host device to the storage system that refers to the read-only clone LUN as the snapshot to prevent a modification of the read-only clone LUN.

18. The system of claim 13, wherein a block transfer protocol layer is revised to render the read-only clone LUN for presentation to the host device as the snapshot of the parent LUN.

19. The system of claim 13, wherein the coalescing occurs at most a 4 kilobyte granularity level, and operates on an active file system of the volume of the storage system, and wherein the coalescing is a background process that is configurable to operate in a manner that is at least one an automatic coalescing, a scheduled coalescing, and a manual coalescing through a Command Line Interface (CLI).

* * * * *